(12) United States Patent
Tomi

(10) Patent No.: US 8,953,203 B2
(45) Date of Patent: Feb. 10, 2015

(54) IMAGE FORMING APPARATUS THAT CHANGES DIRECTION OF IMAGE ON DISPLAY BASED ON AT LEAST COORDINATE INFORMATION AND FACING DIRECTION OF A CAPTURING UNIT

(71) Applicant: Canon Kabushiki Kaisha, Tokyo (JP)

(72) Inventor: Hideyasu Tomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 13/690,207

(22) Filed: Nov. 30, 2012

(65) Prior Publication Data
US 2013/0169831 A1 Jul. 4, 2013

(30) Foreign Application Priority Data
Dec. 7, 2011 (JP) ................................. 2011-268369

(51) Int. Cl.
*H04N 1/00* (2006.01)
*G06F 3/12* (2006.01)

(52) U.S. Cl.
CPC ....... *H04N 1/00278* (2013.01); *H04N 1/00228* (2013.01); *H04N 1/00233* (2013.01); *H04N 1/00244* (2013.01); *G06F 3/1204* (2013.01); *G06F 3/1229* (2013.01); *G06F 3/1256* (2013.01); *G06F 3/1285* (2013.01); *H04N 2201/0094* (2013.01)
USPC ...................................................... 358/1.15

(58) Field of Classification Search
CPC ................... H04N 1/00129; H04N 1/002787; G06F 3/1256
USPC ......................................................... 358/1.15
See application file for complete search history.

(56) References Cited

U.S. PATENT DOCUMENTS

| | | | |
|---|---|---|---|
| 7,664,555 B2 * | 2/2010 | Kawai ............................. | 700/17 |
| 2004/0125401 A1 * | 7/2004 | Earl et al. ..................... | 358/1.15 |
| 2010/0208295 A1 * | 8/2010 | Sato ............................. | 358/1.15 |
| 2011/0058189 A1 * | 3/2011 | Kuwamura .................... | 358/1.9 |

FOREIGN PATENT DOCUMENTS

JP 2009301168 A * 12/2009
JP 2010-219879 A 9/2010

* cited by examiner

*Primary Examiner* — Eric A Rust
(74) *Attorney, Agent, or Firm* — Carter, DeLuca, Farrell & Schmidt, LLP

(57) ABSTRACT

A system including an image forming apparatus and a terminal for displaying an image acquired by a capturing unit on a display, wherein the terminal comprises: a unit which transmits a current position information, a unit which receives the distribution data in response to the transmission of the current position information, a unit which performs display control such that, when an image including the image forming apparatus is displayed on the display, a message included in distribution data distributed by the image forming apparatus and received from the server is superimposedly displayed on the image, a unit which accepts a print instruction made after the message displayed on the display is selected, and a unit which transmits print data to the image forming apparatus that distributed the distribution data containing the selected message according to the print instruction.

18 Claims, 17 Drawing Sheets

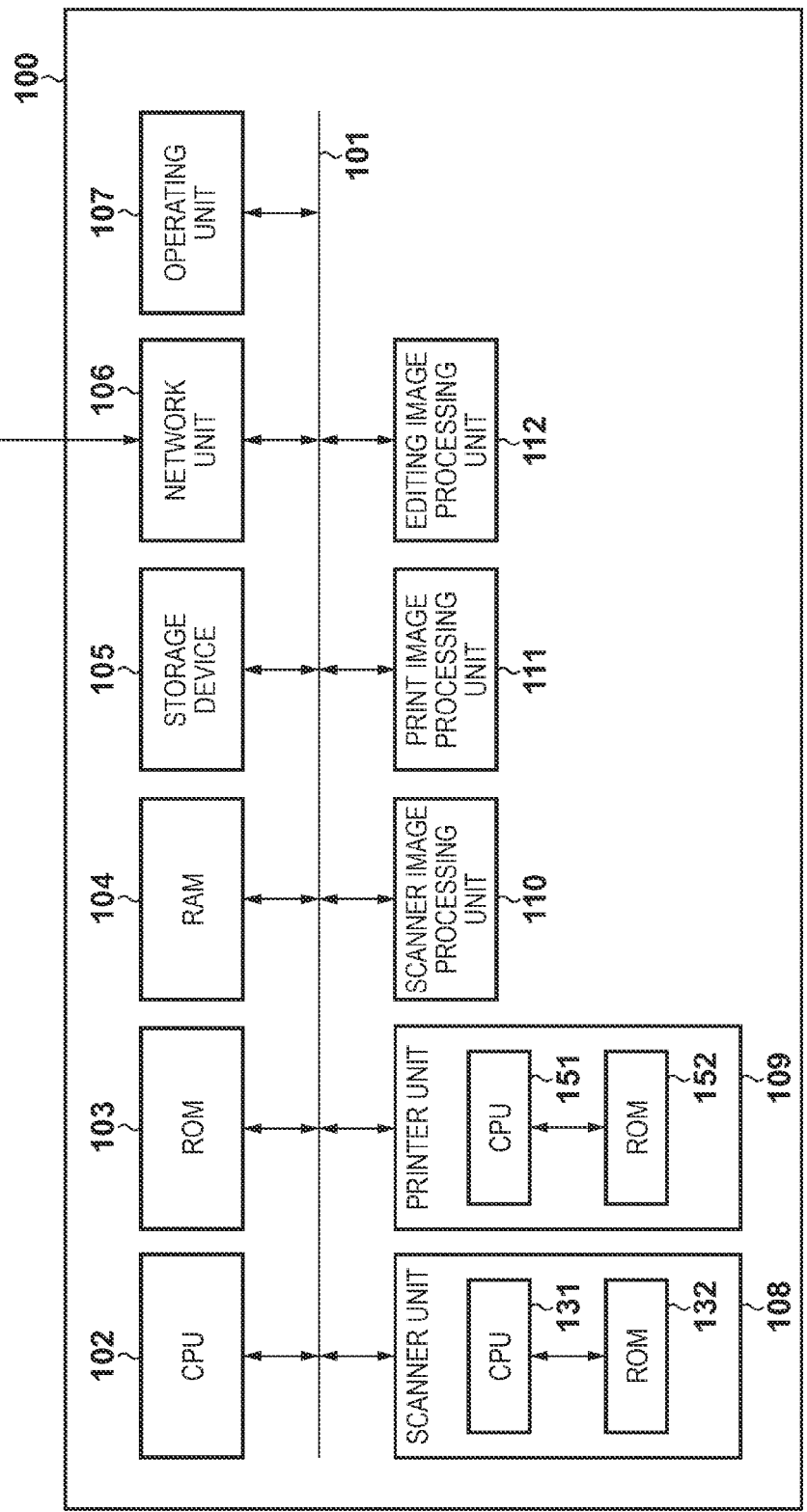

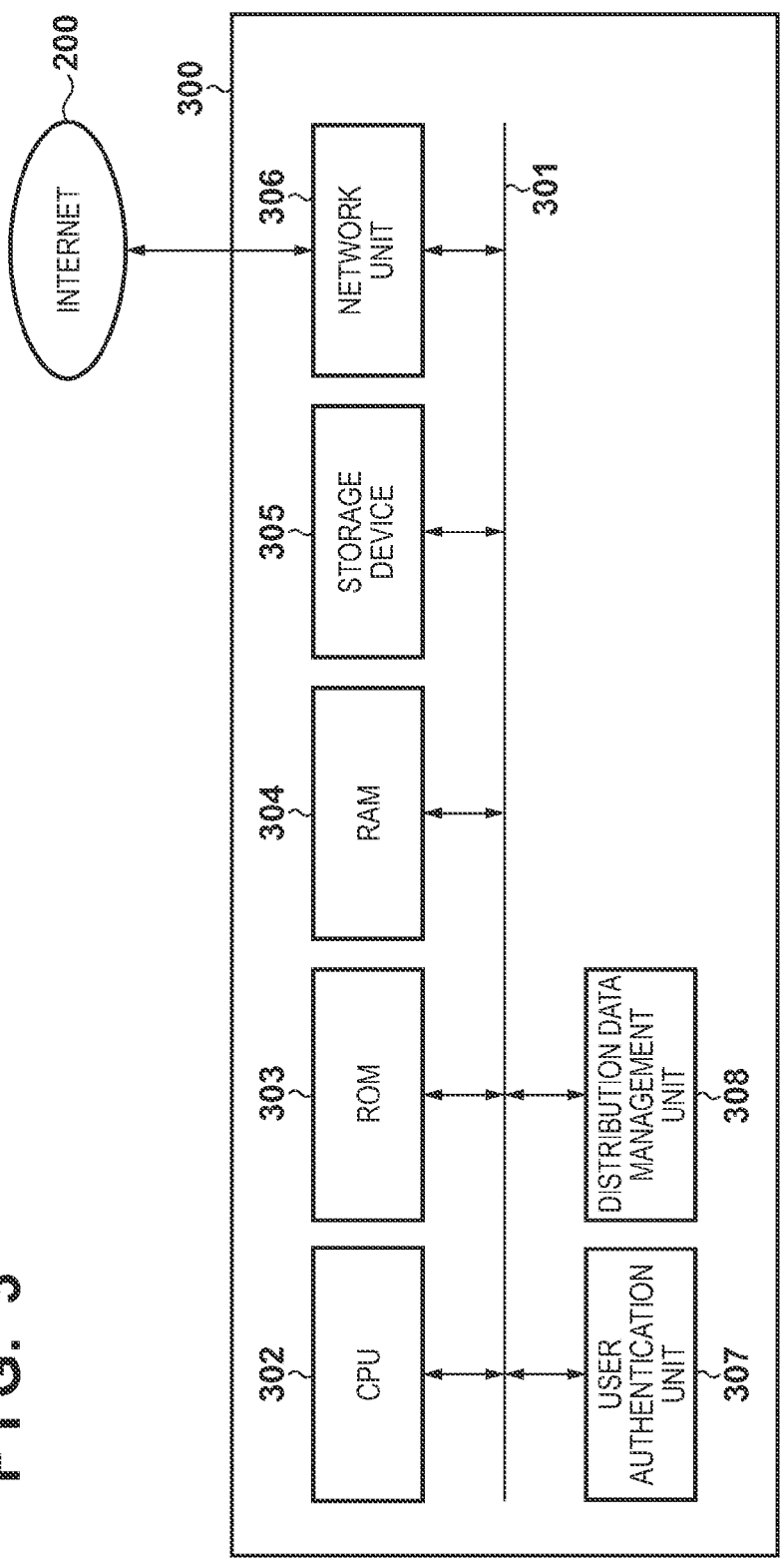

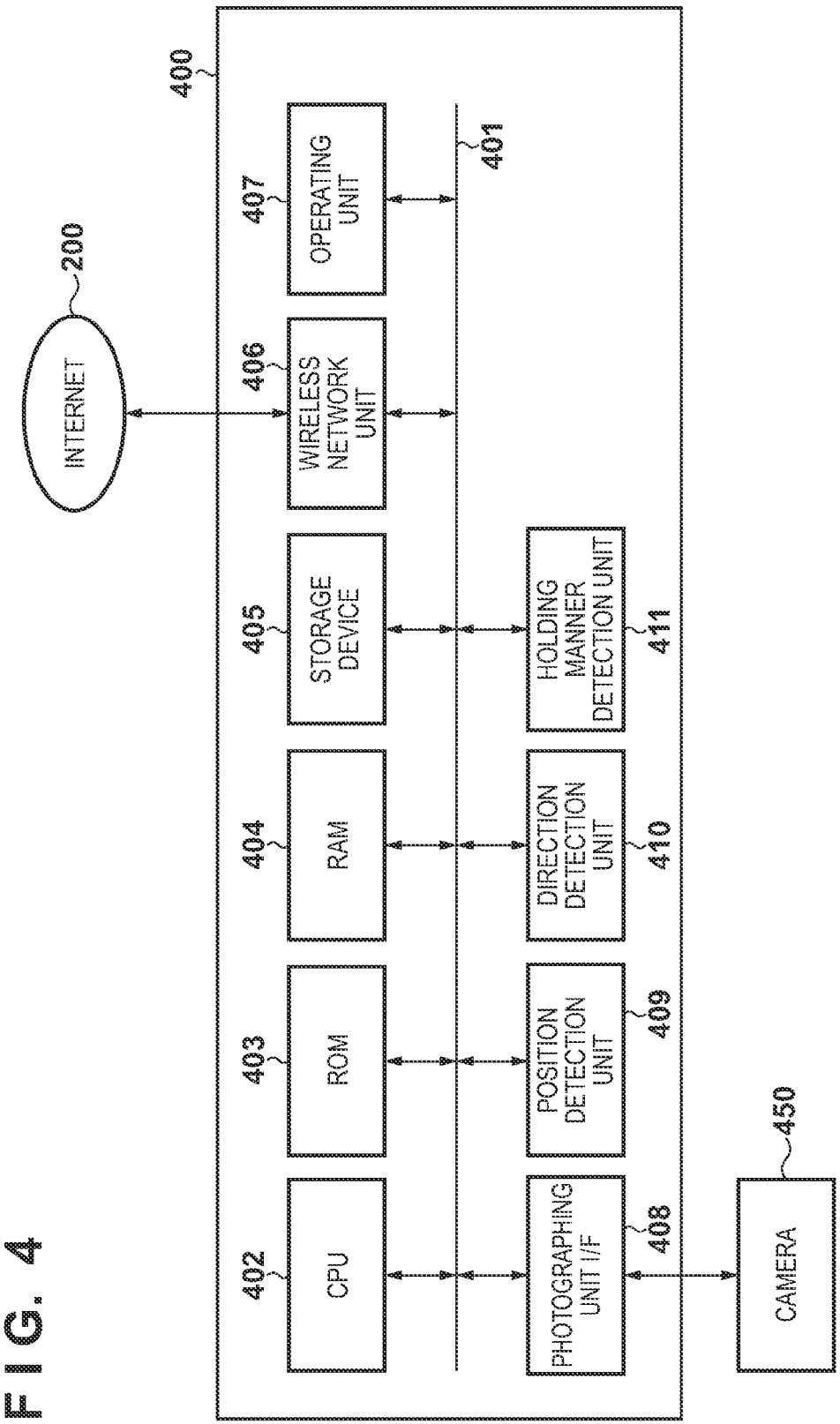

FIG. 7

| IDENTIFYING NAME | DISTRIBUTION DATA |
|---|---|
| MFP601 | JOB IS EXECUTING |
| MFP602 | PRINTING IS ENABLED |
| SFP603 | PAPER JAM HAS OCCURRED |
| MFP604 | PRINTING IS ENABLED |

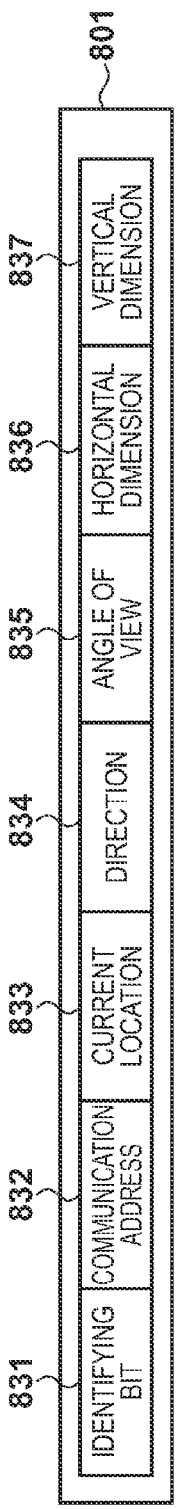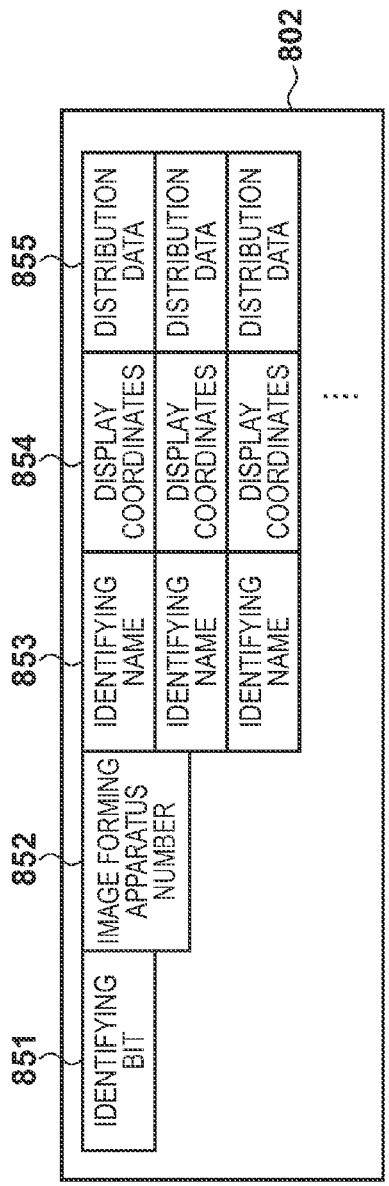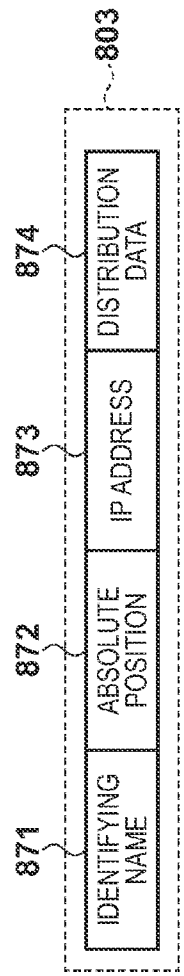

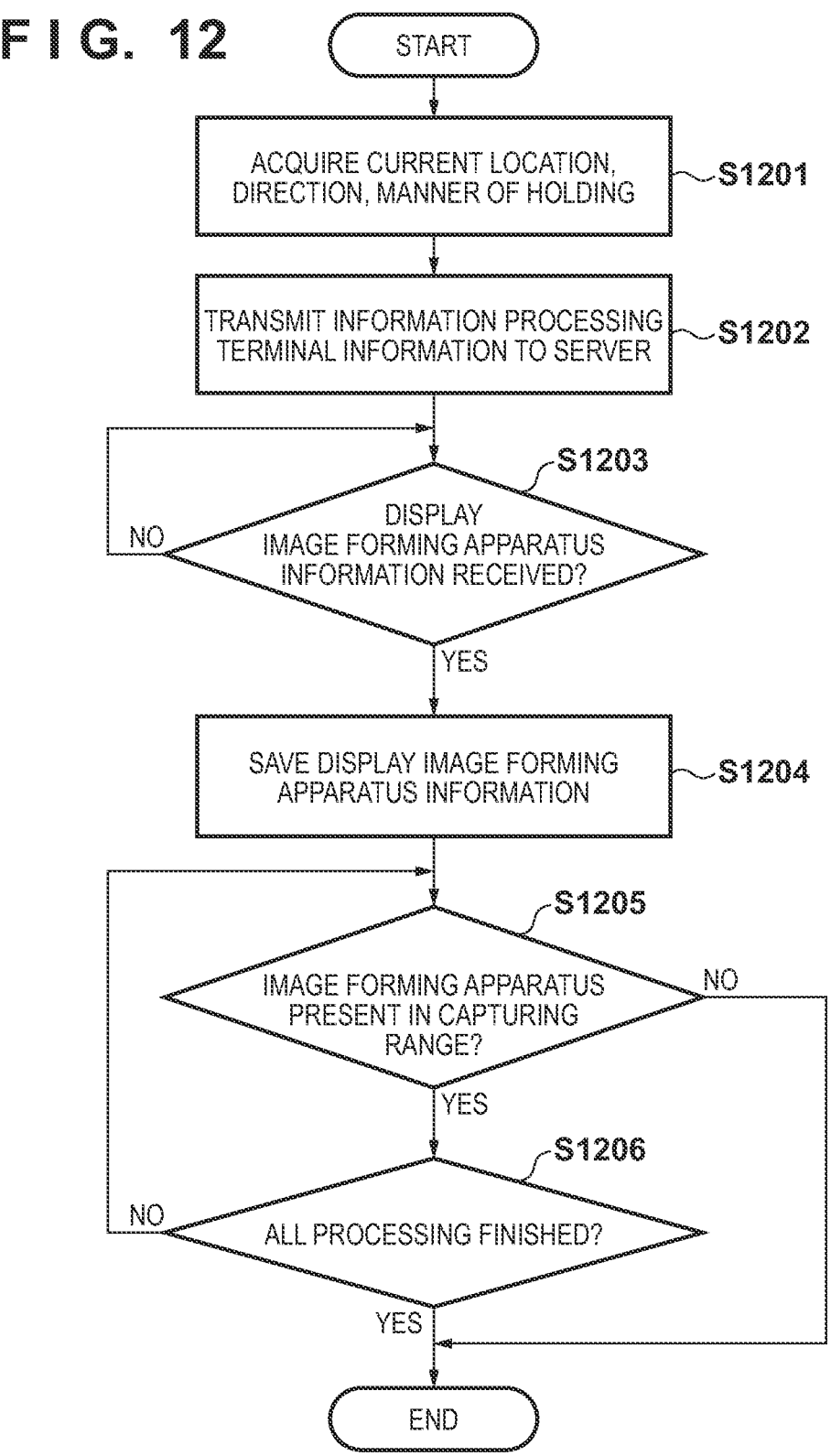

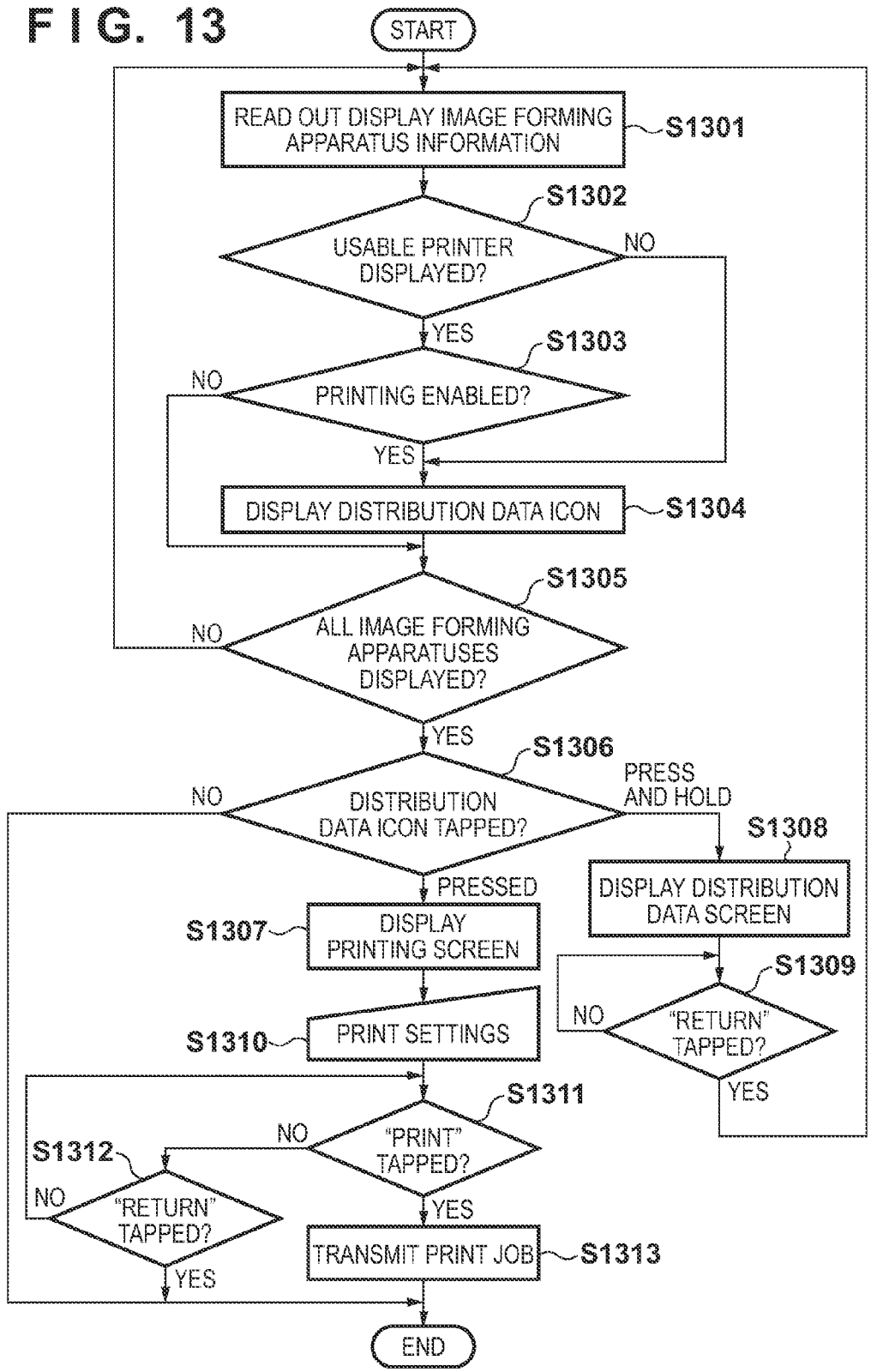

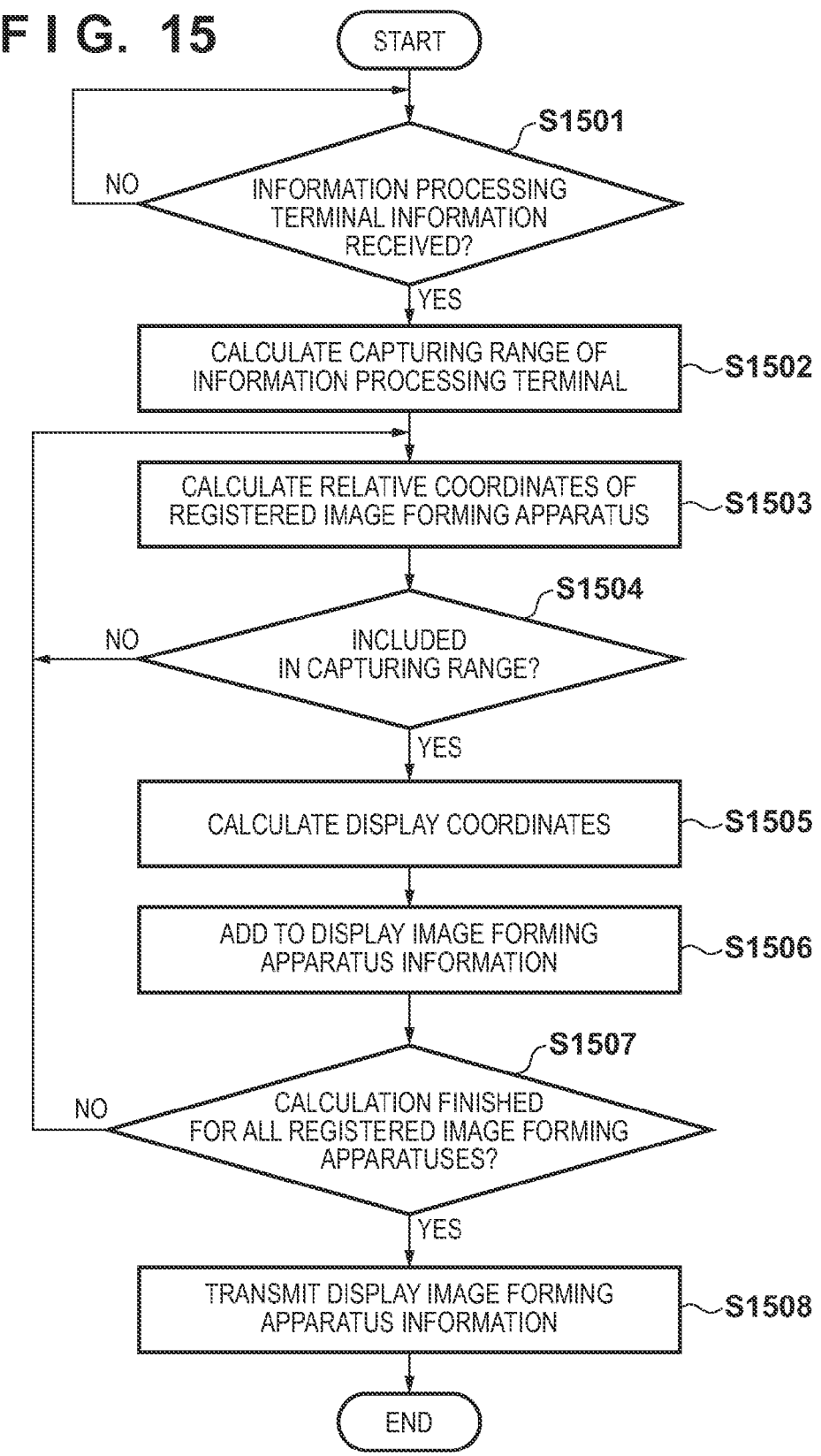

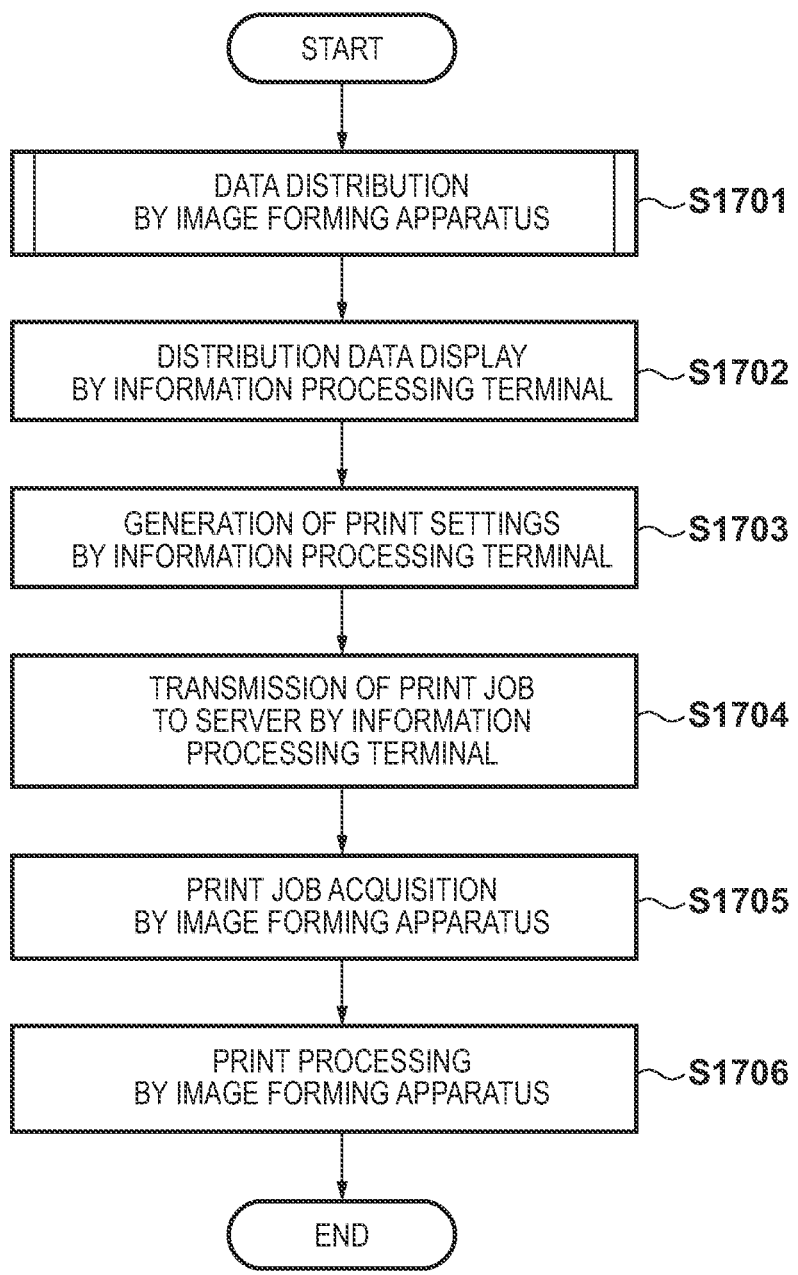

IMAGE FORMING APPARATUS THAT CHANGES DIRECTION OF IMAGE ON DISPLAY BASED ON AT LEAST COORDINATE INFORMATION AND FACING DIRECTION OF A CAPTURING UNIT

BACKGROUND OF THE INVENTION

1. Field of the Invention

The present invention relates to a printing system, an information processing terminal, a server, a control method, and a computer-readable medium. In particular, it relates to a printing system that gives an instruction for printing based on distribution data of an image forming apparatus.

2. Description of the Related Art

In recent years, with the advancement of technology related to mobile devices typified by the smartphone, new information dissemination services are being born. For example, there is a short sentence communication service called Twitter® that publishes Tweets® (short messages) of individual users within a given number of characters.

In addition, in mobile devices functions for acquiring position information of their own, such as GPS (Global Positioning System), are being installed. There are services that display such position information acquisition functions combined with information disseminated on Twitter® etc. For example, at "Sekai Camera®" by Tonchidot Corp., images captured by cameras of smartphones and other information terminals are displayed with superimposed information about the location or object photographed. In this way, it is possible to present an augmented reality, obtaining a sensation as though a tag had been attached to the object or location. Further, in Japanese Patent Laid-Open No. 2010-219879, a technology is disclosed that, displays help information acquired from a help server superimposed on a captured image on a mobile device or similar information terminal.

It is envisaged that in the future, in order to use augmented reality related technology as in Sekai Camera®, also image forming apparatuses etc. will disseminate help information and the like together with position information of the installation site. However, even if one could see such information from an information terminal, this would not mean that conventional services provided by the image forming apparatus, such as printing, could be used from the information terminal. Specifically, it would be necessary to obtain and manage, at the information terminal, necessary information depending on the service, such as network information and machine type information of the image forming apparatus, how to specify print settings and a document to be printed when printing.

In this case, in the system, it is required that information related to a state of an image forming apparatus distributed by the apparatus is easily exchanged, and a user can easily use the service by looking up the information.

SUMMARY OF THE INVENTION

According to one aspect of the present invention, there is provided a printing system including an image forming apparatus, a server, and an information processing terminal for displaying an image acquired by a capturing unit on a display, wherein the image forming apparatus comprises: a distribution unit configured to distribute distribution data that includes position information of the image forming apparatus and a message for being displayed, and a printing unit configured to perform print processing according to received print data, wherein the server comprises: an acquisition unit configured to acquire position information of the information processing terminal, a management unit configured to acquire and manage distribution data distributed by the image forming apparatus, and a transmission unit configured to transmit distribution data identifiable from position information of the image forming apparatus and the information processing terminal, managed by the management unit, and to include a message displayable on a display of the information processing terminal, to the information processing terminal, and wherein the information processing terminal comprises: a position information transmission unit configured to transmit a current position information of the information processing terminal to the server, a reception unit configured to receive the distribution data from the server in response to the transmission of the current position information, a display unit configured to perform display control such that, when an image including the image forming apparatus is displayed on the display, a message included in distribution data distributed by the image forming apparatus and received from the server is superimposedly displayed on the image, an acceptance unit configured to accept a print instruction made after the message displayed on the display is selected, and a print data transmission unit configured to transmit print data to the image forming apparatus that distributed the distribution data containing the selected message according to the print instruction.

According to another aspect of the present invention, there is provided a method for controlling a printing system including an image forming apparatus, a server, and an information processing terminal for displaying an image acquired by a capturing unit on a display, the method comprising: in the image forming apparatus: distributing distribution data that includes position information of the image forming apparatus and a message for being displayed, and performing print processing according to received print data, in the server: acquiring position information of the information processing terminal, acquiring and managing distribution data distributed by the image forming apparatus, and transmitting distribution data identifiable from position information of the image forming apparatus and the information processing terminal, managed in the management step, and including a message displayable on a display of the information processing terminal, to the information processing terminal, and in the information processing terminal: transmitting a current position information of the information processing terminal to the server, receiving the distribution data from the server in response to the transmission of the current position information, performing display control such that, when an image including the image forming apparatus is displayed on the display, a message included in distribution data distributed by the image forming apparatus and received from the server is superimposedly displayed on the image, accepting a print instruction made after the message displayed on the display is selected, and transmitting print data to the image forming apparatus that distributed the distribution data containing the selected message according to the print instruction.

According to another aspect of the present invention, there is provided an information processing terminal for communicating with a server for managing messages distributed by an image forming apparatus, comprising: a position information transmission unit configured to transmit a current position information of the information processing terminal to the server, a reception unit configured to receive data including the messages from the server in response to the transmission of the current position information, a display unit configured to perform display control such that, when an image including the image forming apparatus is displayed on the display, a message distributed by the image forming apparatus and received from the server is superimposedly displayed on the image, an acceptance unit configured to accept a print instruction made after the message displayed on the display is selected, and a print data transmission unit configured to transmit print data to the image forming apparatus that distributed the selected message according to the print instruction.

According to another aspect of the present invention, there is provided a control method in an information processing terminal communicating with a server for managing messages distributed by an image forming apparatus, comprising: transmitting a current position information of the information processing terminal to the server, receiving data including the messages from the server in response to the transmission of the current position information, performing display control such that, when an image including the image forming apparatus is displayed on the display of the information processing terminal, a message distributed by the image forming apparatus and received from the server is superimposedly displayed on the image, accepting a print instruction made after the message displayed on the display is selected, and transmitting print data to the image forming apparatus that distributed the selected message according to the print instruction.

According to another aspect of the present invention, there is provided a server for being communicably connected to an image forming apparatus and to an information processing terminal for displaying an image acquired by a capturing unit on a display, comprising: an acquisition unit configured to acquire position information of the information processing terminal, a management unit configured to acquire and manage distribution data distributed by the image forming apparatus, and a transmission unit configured to transmit distribution data identifiable from position information of the image forming apparatus that is included in the managed distribution data and position information of the information processing terminal, and to include a message displayable on a display of the information processing terminal, to the information processing terminal, wherein when in the information processing terminal an image including the image forming apparatus is displayed on the display, a message distributed by the image forming apparatus and received from the server is superimposedly displayed on the image, and a print instruction is given upon selecting the message displayed on the display.

According to another aspect of the present invention, there is provided a control method in a server communicably connected to an image forming apparatus and to an information processing terminal for displaying an image acquired by a capturing unit on a display, the method comprising: acquiring position information of the information processing terminal, acquiring and managing distribution data distributed by the image forming apparatus, and transmitting distribution data identifiable from position information of the image forming apparatus that is included in the managed distribution data and position information of the information processing terminal, and including a message displayable on a display of the information processing terminal, to the information processing terminal, wherein when in the information processing terminal an image including the image forming apparatus is displayed on the display, a message distributed by the image forming apparatus and received from the server is superimposedly displayed on the image, and a print instruction is given upon selecting the message displayed on the display.

According to the present invention, the necessary information exchange for printing, such as designating and setting an apparatus for performing printing and designating a document, can be flexibly performed by using information distributed by an apparatus.

Further features of the present invention will become apparent from the following description of exemplary embodiments (with reference to the attached drawings).

BRIEF DESCRIPTION OF THE DRAWINGS

FIG. 2 is a block diagram showing the internal configuration of an image forming apparatus.

FIG. 3 is a block diagram showing the internal configuration of a server.

FIG. 4 is a block diagram showing the internal configuration of an information processing terminal.

FIG. 7 is a diagram showing an example of distribution data of an image forming apparatus.

FIGS. 8A, 8B and 8C are diagrams showing examples of a format of data.

FIG. 12 is a flowchart of the state acquisition processing in the information processing terminal according to the first embodiment.

FIG. 13 is a flowchart of the display processing in the information processing terminal according to the first embodiment.

FIG. 15 is a flowchart of the processing in a server according to the first embodiment.

FIG. 17 is a schematic flowchart of the overall operation of a printing system according to a second embodiment.

DESCRIPTION OF THE EMBODIMENTS

Hereinafter, an embodiment for carrying out the present invention will be described with reference to the drawings. The present invention is not limited to the configuration shown in the following embodiment.

First Embodiment

<Configuration of Printing System>

Figure 1:
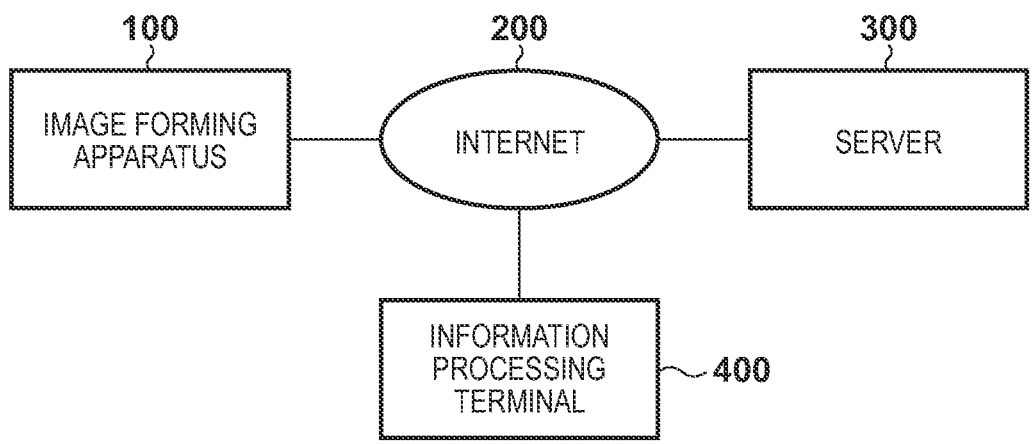
FIG. 1 is a block diagram showing the configuration of a printing system.

The system configuration of the present invention will be explained. FIG. 1 is a diagram showing an overall configuration of a printing system according to the present embodiment. This system is composed of an image forming apparatus 100, a server 300, and an information processing terminal 400, which are connected via the Internet 200. Each component is assumed to have been granted an IP address for identifying devices over the network. Here, each two of the apparatuses are assumed to be communicably connected. In the present embodiment, the information processing terminal 400 is assumed to be a mobile terminal that a user can hold and carry about, for example such as a smartphone. Further, although in FIG. 1 the image forming apparatus 100 and the server 300 are shown as single structures, they are not limited thereto. For example, multiple physical devices may as well realize the function of server 300 cooperatively.

Also, a network communicably connected to the apparatuses is not limited to the Internet 200, and another network such as a LAN may be used, for example.

<Hardware Configuration>

(Image Forming Apparatus)

FIG. 2 is a block diagram illustrating the internal configuration of the image forming apparatus 100 shown in FIG. 1. Individual units in the image forming apparatus 100 are electrically connected via a system bus 101. CPU 102 is a central calculation unit for controlling the entire image forming apparatus 100. ROM 103 stores a program to be run by CPU 102 at startup of the image forming apparatus 100. RAM 104 is a work memory for temporarily storing data used by CPU 102 for calculation. A storage device 105, which consists e.g. of a hard disk drive (HDD), holds software and settings for control of the image forming apparatus 100, saved documents, and the like.

A network unit 106, being an interface to the Internet 200, is responsible for input and output of information from/to other information devices over the Internet 200. An operating unit 107 is responsible for control in accordance with operations from the user. The operating unit 107 comprises a display, for example a liquid-crystal operation panel (not shown) composed of a liquid-crystal display and a touch panel etc. A scanner unit 108 includes an illumination lamp, scanning mirror etc. (not shown) for performing document reading. A printer unit 109 includes a photosensitive drum and a fixing device (not shown) for performing image formation and fixing. A scanner image processing unit 110 performs image processing such as correction, processing, and conversion with respect to image data inputted from the scanner unit 108.

A print image processing unit 111 performs image processing such as correction, processing, and conversion with respect to image data to be outputted (printed) to the printer unit 109. An editing image processing unit 112 performs JPEG, JBIG, MMR, or MH image compression and decompression processing, as well as rotation of image data. In FIG. 2, the scanner unit 108 and the printer unit 109 are respectively provided with internal CPUs 131, 151 and ROMs 132, 152. The CPUs 131, 151 perform processing in accordance with programs stored respectively in the ROMs 132, 152. Also, each of the CPUs 131, 151 performs communication when needed with CPU 102, to execute control of the scanner unit 108 and printer unit 109 following the instructions of CPU 102.

On the CPUs 131, 151 of the scanner unit 108 and printer unit 109, there are running e.g. a normal operation management program, a power state management program, an error management program, a service information management program and the like. With these programs, the finer control and management of document reading, printing to paper, and other tasks is performed. Various types of event information detected by execution of the programs are reported from the CPUs 131, 151 of the scanner unit 108 and printer unit 109 to CPU 102. Additionally, the CPUs 131, 151 report event information in response to requests of CPU 102. Regarding the events reported here, there is e.g. original/printing paper information, power control information, job execution information, error information (information on paper jam, out of toner, abnormal temperature, abnormal operation etc.), and so forth. Events dealt with are not limited to those described above, but may e.g. be targeted to state changes occurring within the image forming apparatus 100 and the like.

When an event occurs, the image forming apparatus 100 issues distribution data and distributes it to the server 300. This process will be described later.

(Server)

FIG. 3 is a block diagram illustrating the internal configuration of the server 300 shown in FIG. 1. Individual units in the server 300 are electrically connected via a system bus 301. CPU 302 is a central calculation unit for controlling the entire server 300. ROM 303 stores a program to be run by CPU 302 at startup of the server 300. RAM 304 is a work memory for temporarily storing data used by CPU 302 for calculation. A storage device 305, which consists e.g. of a hard disk drive (HDD), stores programs and data of various types used by the server 300. Further, the storage device 305 stores data distributed by the image forming apparatus 100 over the Internet 200.

A network unit 306, being an interface to the Internet 200, is responsible for input and output of information from/to other information devices over the Internet 200. A user authentication unit 307 performs authentication of users who log in to the server 300. For example, when the image forming apparatus 100 distributes information, the distribution will be performed after logging in to the server 300. A distribution data management unit 308 manages the data distributed by the image forming apparatus 100. For example, the distribution data management unit 308 links distribution data with user names, or sets browsing rights by user name.

(Information Processing Terminal)

FIG. 4 is a block diagram illustrating the internal configuration of the information processing terminal 400 shown in FIG. 1. Individual units in the information processing terminal 400 are electrically connected via a system bus 401. CPU 402 is a central calculation unit for controlling the entire information processing terminal 400. ROM 403 stores a program to be run by CPU 402 at startup of the information processing terminal 400. RAM 404 is a work memory for temporarily storing data used by CPU 402 for calculation.

A storage device 405, which consists e.g. of flash ROM, stores programs and data of various types used by CPU 402. Wireless network unit 406 is an interface for communicating with the Internet 200 via wireless communications such as wireless LAN. An operating unit 407 performs input and output of information between the user and the information processing terminal 400. Photographing unit I/F 408 is an interface for receiving an image that has been acquired using a camera 450 being the photographing unit. Note that, in FIG. 4, the camera 450 is shown outside the information processing terminal 400, but may be configured to be included therein.

A position detection unit 409, using a GPS receiver or the like (not shown), performs identification of the current location of the information processing terminal 400. A direction detection unit 410, using a geomagnetic sensor or the like (not shown), detects the direction in which the information processing terminal 400 is currently facing. A holding manner detection unit 411, using an acceleration sensor or the like (not shown), detects whether the user is holding the information processing terminal 400 in portrait orientation, or is holding it in landscape orientation. Information on the facing direction or the holding orientation will be used to identify a range captured by the camera 450.

Figure 5A:
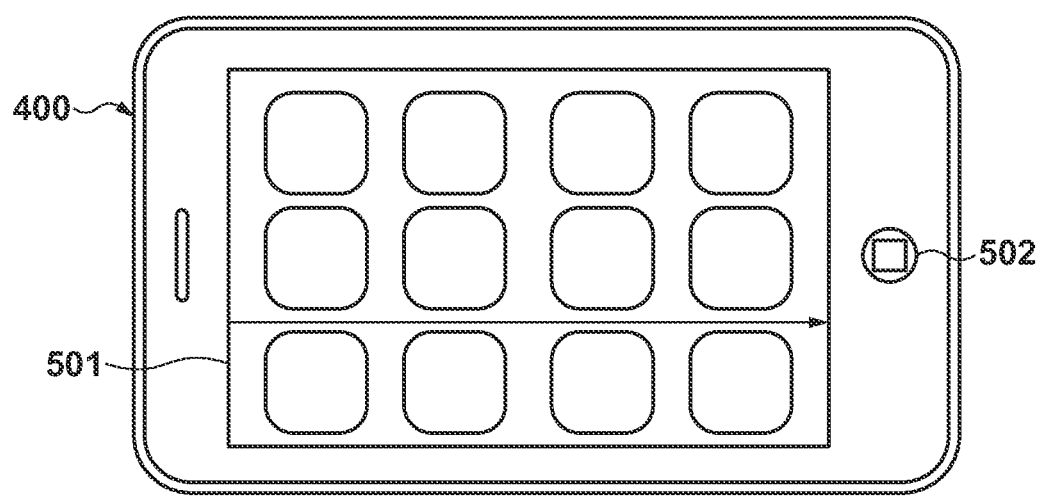
FIGS. 5A and 5B are views illustrating examples of an external appearance of the information processing terminal.
Figure 5B:
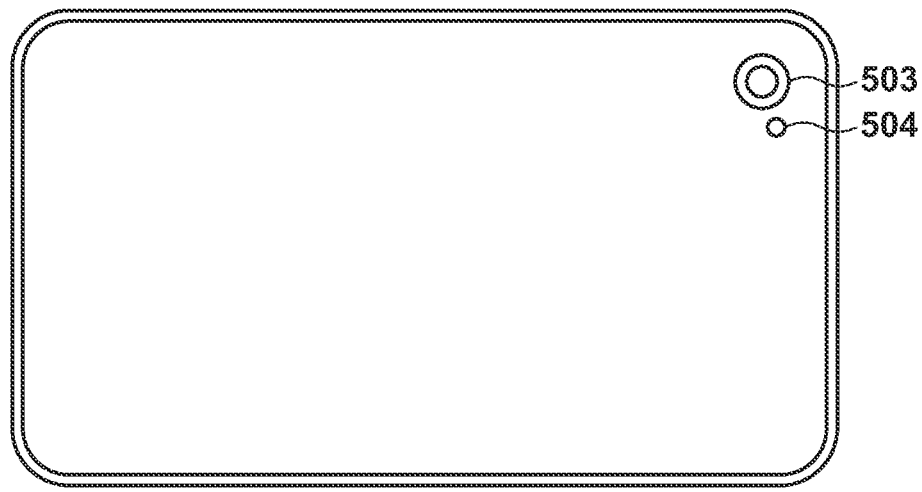

FIGS. 5A and 5B are views illustrating examples of an external appearance of the information processing terminal 400. FIG. 5A is an example of the appearance of the front surface of the information processing terminal 400. Touch panel 501 is a liquid crystal touch panel for presenting information to the user and receiving input from the user. In this embodiment, the liquid crystal touch panel is used to realize a reception unit. It is assumed that, depending on the touch duration during input, the touch panel 501 is able to distinguish between a normal tap (press) and a long-time tap (press and hold). Home button 502 is used e.g. to suspend the application running in the information processing terminal 400, to return to the home screen. FIG. 5B is an example of the appearance of the back surface of the information processing terminal 400. Camera 503 is a camera for photographing the surroundings. Flash 504 is a flash for assisting the photographing with the camera 503.

Figure 6:
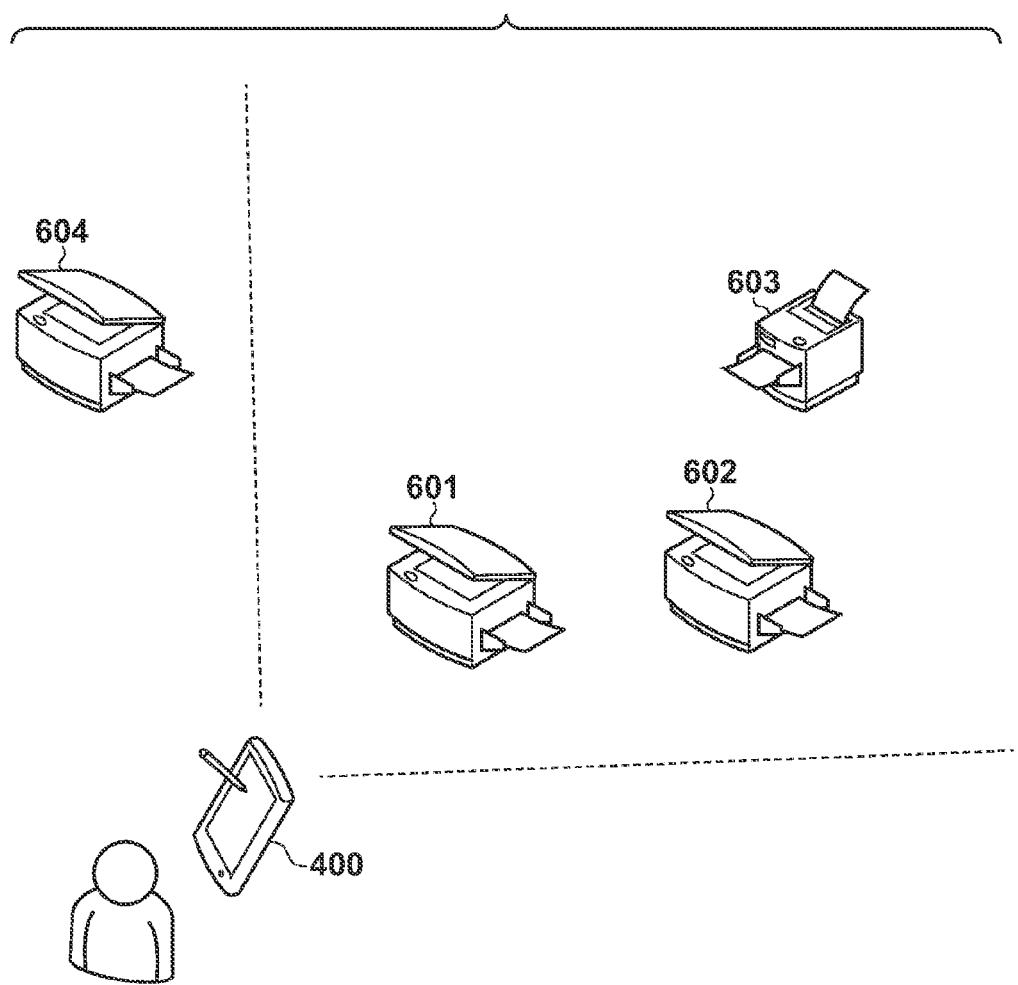
FIG. 6 is a diagram showing a positional relationship of constituent elements of a printing system.

FIG. 6 is a diagram showing a positional relationship of constituent elements in the present embodiment. Image forming apparatuses 601, 602, 603, and 604 that have the same internal configuration with the image forming apparatus 100 are shown in FIG. 6. The image forming apparatuses 601, 602, and 603 are arranged so as to be captured by the camera 450 of the information processing terminal 400 at the same time. At this time, the image forming apparatus 604 is arranged outside a capturing range.

Here, the term "distribution data" as used in the present description shall be commented on. For example, distribution data applies to a Tweet® on the above-mentioned short sentence communication service Twitter®, and the like. Typically, such a short sentence communications service imposes a restriction regarding the maximum number of characters that can be included per one message such as a Tweet®. In this embodiment, the image forming apparatus 100 is assumed to issue, as distribution data, short messages depending on its state (events etc.) within the maximum number of characters allowed by the rules of a short sentence communications service. Note that distribution data distributed by the image forming apparatuses 601, 602, 603, and 604 is assumed to be contents shown in FIG. 7.

<Data Format>

In the following, data formats used in the present embodiment will be explained by making reference to FIGS. 8A through 8C.

An example of a format of information processing terminal information 801 is shown in FIG. 8A. The information processing terminal information 801 is information to notify the server 300 of the current location and captured range of the information processing terminal 400, as well as the dimensions of its touch panel. The information processing terminal information 801 includes an identifier bit field 831 indicating that this is information processing terminal information, a return address field 832 indicating a return destination for display image forming apparatus information 802, and a current location field 833 indicating the current location of the information processing terminal 400. The current location field 833 includes coordinate information such as latitude, longitude, and altitude (geolocation) of the current position of the information processing terminal 400. In addition, the information processing terminal information 801 includes a direction field 834 indicating the direction in which the information processing terminal 400 is facing, an angle-of-view field 835 indicating the angle of view of the camera 450 built into the information processing terminal 400, as well as a horizontal-dimension field 836 and vertical-dimension field 837 indicating the horizontal dimension and vertical dimension of the touch panel built into the information processing terminal 400.

An example of a format of display image forming apparatus information 802 is shown in FIG. 8B. The display image forming apparatus information 802 is information for the server 300 to notify the information processing terminal 400 of the information of image forming apparatuses 100 in the capturing range of the information processing terminal 400 and the display position of each image forming apparatus on the information processing terminal 400. The display image forming apparatus information 802 includes an identifier bit field 851 indicating that this is display image forming apparatus information 802, an image forming apparatus number field 852 indicating the number of image forming apparatuses included in the display image forming apparatus information 802, and identifying name fields 853 that indicate identifying names of the image forming apparatuses 100. In addition, the display image forming apparatus information 802 includes display coordinate fields 854 that indicate display coordinates on the touch panel of the information processing terminal 400, and distribution data fields 855 that indicate data distributed by the image forming apparatus. The distribution data fields 855 can be resized. For example, they may store only the latest distribution data, or may store an arbitrarily limited number. The identifying name fields 853, display coordinate fields 854, and distribution data fields 855 are stored multiply depending on the number of the image forming apparatuses. In the distribution data fields 855, as an example, information such as shown in FIG. 7 is stored.

FIG. 8C is an image forming apparatus information table 803 for managing position information of the image forming apparatuses 100. The image forming apparatus information table 803 includes as attributes an identifying name 871, an absolute position 872, an IP address 873, and distribution data 874 of the image forming apparatuses 100. The server 300 consults the information that is stored in the image forming apparatus information table 803, stores the respective information into the format of the display image forming apparatus information 802, and communicates it to the information processing terminal 400. The image forming apparatus information table 803 is stored in the storage device 305 of the server 300.

<Overall Flow of the Printing System>

Figure 9:
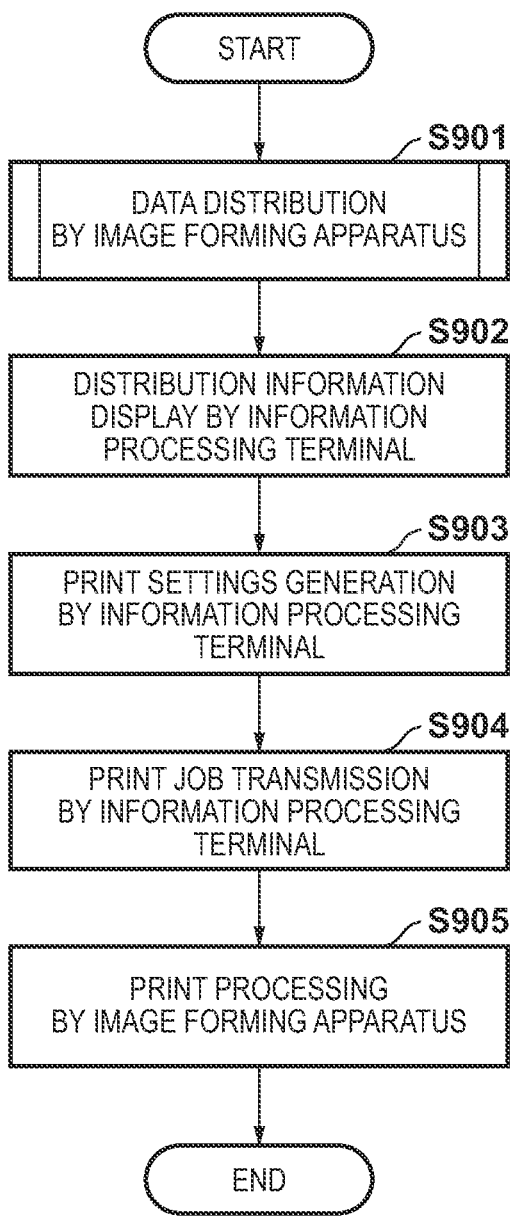
FIG. 9 is a schematic flowchart of the overall operation of a printing system according to a first embodiment.

In FIG. 9, an overall flowchart is shown wherein, in use of the present printing system, the image forming apparatus 100 distributes data depending on the state of the apparatus, and a printing instruction is given from the information processing terminal 400.

First, in S901 the image forming apparatus 100 distributes data. The details will be described below with reference to FIG. 10. Then, in S902 the information processing terminal 400 displays the distribution data. The details will be described below, but the most suitable display is given while the information processing terminal 400 and server 300 transmit and receive the necessary data. Next, in S903, the information processing terminal 400 generates print settings in response to input from the user. The details will be described below with reference to FIG. 10, together with the flow of distribution data display by the information processing terminal 400. In S904, the information processing terminal 400 transmits a print job including print data to the image forming apparatus 100. The details will be described below together with the flow of distribution data display by the information processing terminal 400. Finally, in S905, the image forming apparatus 100 executes the print processing.

<Data Distribution Flow>

Figure 10:
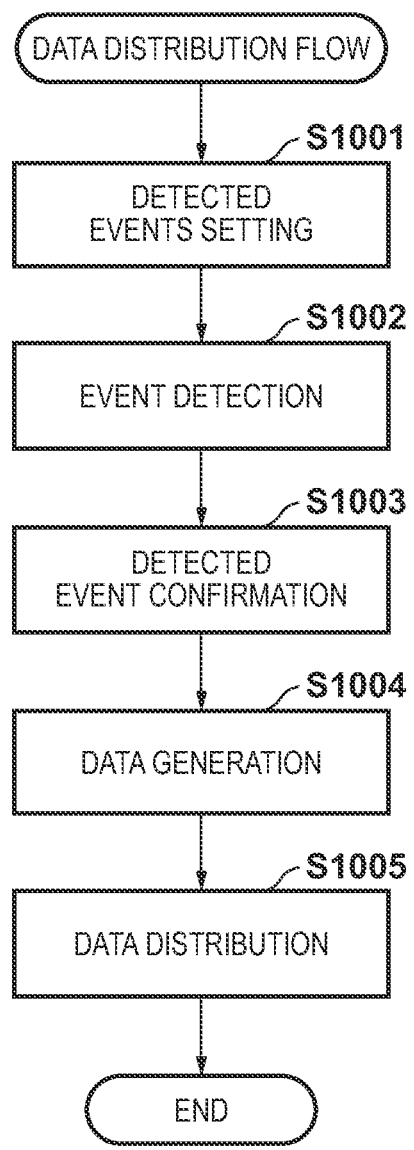
FIG. 10 is a data distribution flowchart of an image forming apparatus.

FIG. 10 is a flowchart showing an information distribution flow. A process in each step in the flowchart of FIG. 10 is performed by the CPU 102 of the image forming apparatus 100 reading and executing a program stored in the storage device 105.

S1001 is a detected events setting step. The image forming apparatus 100 performs setting and registration to detect events that occur internally, such as at the scanner unit 108 and printer unit 109, and distribute the detected event information. Examples of events that can be set here are power on/off, entering/leaving power saving mode, jam occurrence/resolution, out of toner occurrence/resolution, out of paper occurrence/resolution, service information, and so on. Any other events can be handled as long as they have some kinds of influences on printing processing. Data is distributed to a predetermined destination when the events set occur.

Setting of the destination for sending the distribution data and of the position information of the image forming apparatus 100 is also performed in step S1001. The setting of data is carried out by having the user select and designate setting items displayed on the operating unit 107. Further, the user may set the setting items also via the network unit 106 from the Internet 200. The settings are recorded in the storage device 105. At the time of executing the information distribution flow, the setting information is sent from the storage device 105 to the RAM 104 for accelerated process execution.

S1002 is an event detection step. The image forming apparatus 100 is in a state waiting for the detection of the event that has occurred. The event information detected at the scanner unit 108 and printer unit 109 is transmitted to the CPU 102, such that the CPU 102 is in a position to constantly monitor the state of the image forming apparatus 100. S1003 is an event confirmation step. The image forming apparatus 100 performs a confirmation whether the event detected in S1002 is an event that was set in S1001.

S1004 is a data generation step. The image forming apparatus 100 generates the distribution data. If the occurrence of a set event was detected in S1003, the image forming apparatus 100 performs the generation of the distribution data in response to the event. The distribution data includes a short message corresponding to the abovementioned event that is used for being displayed on other apparatuses, and position information of the image forming apparatus 100. Examples of the position information include a uniform resource locator (URL) that indicates logical position information and the like.

S1005 is a data distribution step. The image forming apparatus 100 sends the distribution data generated in S1004 to the server 300. The CPU 102 of the image forming apparatus 100 creates the distribution data within the RAM 104, and sends it via the network unit 106 and the Internet 200 to the server 300, using the transmit destination set in the storage device 105.

<Processing in the Information Processing Terminal>

Figure 11:
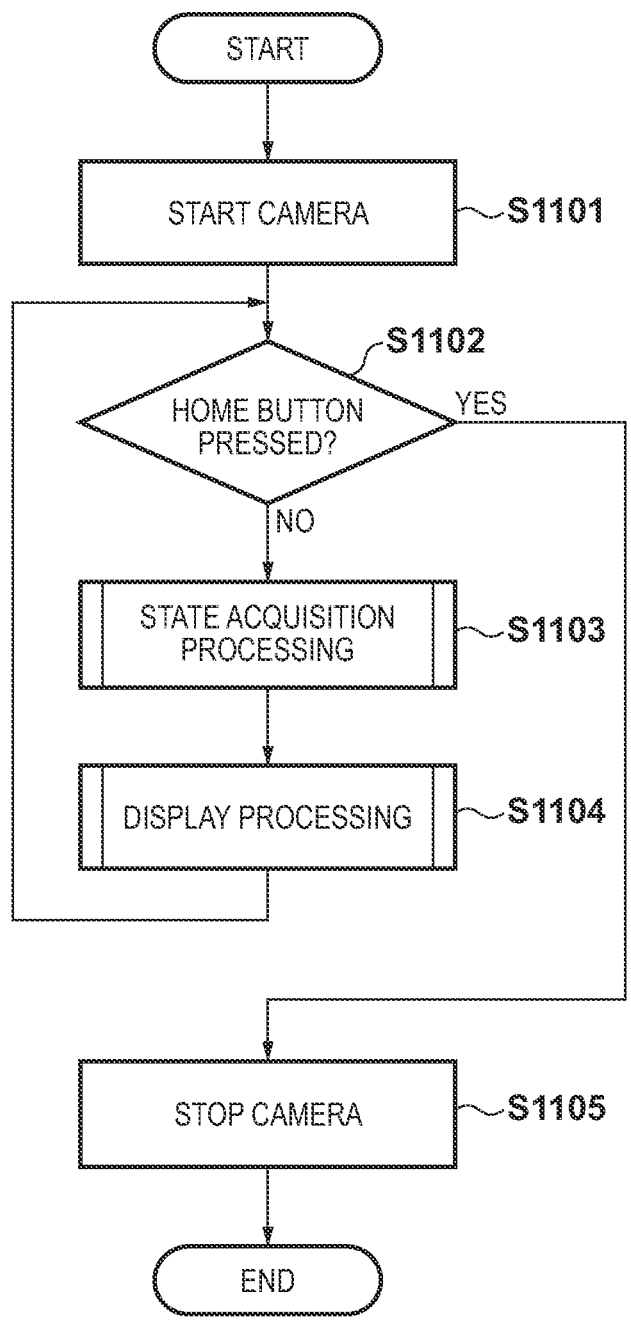
FIG. 11 is a flowchart of the overall processing in an information processing terminal according to the first embodiment.

Next, with reference to the flowcharts in FIG. 11, FIG. 12, and FIG. 13 as well as FIGS. 14A to 14E, the processing in the information processing terminal 400 of the present embodiment will be explained. FIG. 11, FIG. 12, and FIG. 13 respectively show flows of the overall processing, state acquisition processing, and display processing of the information processing terminal 400 of the present embodiment. FIGS. 14A to 14E are an example of screens displayed on the touch panel 501 of the information processing terminal 400 according to the present embodiment. Further, for each step in the flowchart in FIG. 11, FIG. 12, and FIG. 13, processing is assumed to be performed by the CPU 402 of the information processing terminal 400 by executing a program stored in the storage device 405.

(Overall Flow)

Figure 14A:
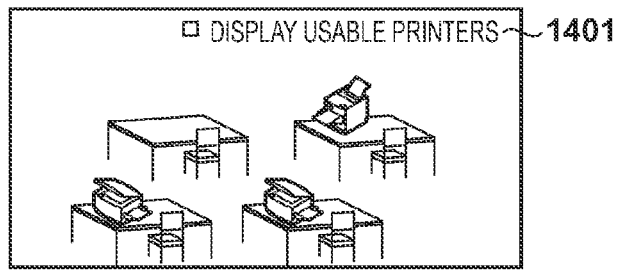
FIGS. 14A, 14B, 14C, 14D and 14E are diagrams showing examples of display screens on the information processing terminal according to the first embodiment.

Below, with reference to the flowchart of FIG. 11 and FIG. 14A, the overall flow of processing in the information processing terminal 400 will be explained. This processing flow is realized by the CPU 102 of the information processing terminal 400 reading and executing a program stored in the ROM 103 or a similar storage unit.

FIG. 11 is an overall flow of the processing in the information processing terminal 400. In FIG. 11, the information processing terminal 400 in S1101 first starts the camera 450 and begins to capture. Here, FIG. 14A gives an example of a screen that is displayed on the touch panel 501 upon activating the camera 450. Checkbox 1401 in FIG. 14A is a checkbox that is checked in case of indicating usable printers (image forming apparatuses) among the printers within the capturing range. Then, in S1102 the information processing terminal 400 determines whether the home button 502 has been pressed, to proceed to S1105 in case that the home button 502 has been pressed (YES in S1102). In case that the home button 502 has not been pressed (NO in S1102), the information processing terminal 400 performs state acquisition processing in S1103. Details of the state acquisition processing will be described below with reference to FIG. 12. Afterwards, the information processing terminal 400 performs display processing in S1104. Details of the display processing will be described below with reference to FIG. 13. In the case that in S1102 the home button 502 has been pressed, the information processing terminal 400 in S1105 stops the camera 450 to terminate capturing.

(State Acquisition Processing Flow)

Hereinafter, with reference to the flowchart of FIG. 12, the flow of the state acquisition processing in the information processing terminal 400 will be explained.

In S1201, the information processing terminal 400 acquires the current location of the information processing terminal 400, the direction in which the information processing terminal 400 is facing, and the manner in which the user holds the information processing terminal 400, respectively from the position detection unit 409, the direction detection unit 410, and the holding manner detection unit 411. Then, in S1202, the information processing terminal 400 transmits the information processing terminal information 801 to the server 300. At this time, if the information processing terminal 400 is held in landscape orientation, the short side dimension of the touch panel is stored in the horizontal-dimension field 836, and the long side dimension in the vertical-dimension field 837 of the information processing terminal information 801. If the information processing terminal 400 is held in portrait orientation, the long side dimension of the touch panel 501 is stored in the horizontal-dimension field 836, and the short side dimension in the vertical-dimension field 837. Thus, the transmission of current position information of the information processing terminal 400 is performed.

In addition, the current location obtained in S1201 is stored in the current location field 833, and the direction obtained in S1201 in the direction field 834, while the angle of view of the camera 450 is stored in the angle-of-view field 835. Then, in S1203, the information processing terminal 400 waits until it receives the display image forming apparatus information 802 sent from the server 300. After receiving the display image forming apparatus information 802 (YES in S1203), the information processing terminal 400 in S1204 stores the display image forming apparatus information 802 in the storage device 405.

Then, in S1205, by consulting the image forming apparatus number field 852 of the display image forming apparatus information 802, the information processing terminal 400 determines whether image forming apparatuses 100 are within the capturing range of the information processing terminal 400. If there are no image forming apparatuses 100 within the capturing range (NO in S1205), the information processing terminal 400 terminates the state acquisition processing. If there are image forming apparatuses 100 within the capturing range (YES in S1205), the information processing terminal 400 in S1206 performs processing for all image forming apparatuses 100 included in the display image forming apparatus information 802 and then determines whether the processing has completed for all image forming apparatuses 100 included in the display image forming apparatus information 802. In case the processing for all image forming apparatuses 100 (YES in S1206) has completed, the information processing terminal 400 terminates the state acquisition processing. In case that unprocessed image forming apparatuses 100 remain (NO in S1206), the processing returns to S1205 and the information processing terminal 400 performs processing with respect to the unprocessed image forming apparatuses 100.

(Display Processing)

Below, with reference to the flowchart in FIG. 13 and FIGS. 14B to 14E, the flow of the display processing in the information processing terminal 400 will be explained. FIG. 13 is a flowchart of the display processing in the information processing terminal 400.

In S1301, the information processing terminal 400 reads out one display image forming apparatus information 802 of the display image forming apparatus information 802 saved in the information processing terminal 400. Then, the information processing terminal 400 determines in S1302 whether there is a check in the checkbox 1401. If there is no check in the checkbox 1401 (NO in S1302), the information processing terminal 400 in S1304 displays a superimposed distribution data icon for the image forming apparatus on the touch panel 501. Then, it proceeds to S1305.

Figure 14B:
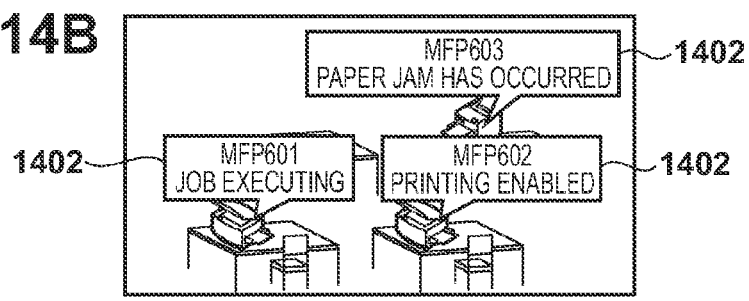

An example of a capturing screen in a state where superimposed distribution data icons are displayed is shown in FIG. 14B. In FIG. 14B, each of the distribution data icons 1402 is a display example of an icon for displaying distribution data of a respective image forming apparatus. In the distribution data icons 1402, the identifying names and distribution data of the image forming apparatuses are displayed, having been read out from the display image forming apparatus information 802.

In case that there is a check in the checkbox 1401 (YES in S1302), the information processing terminal 400 in S1303 consults the distribution data, read out from the display image forming apparatus information 802. Furthermore, the information processing terminal 400 determines whether it is possible to print on the image forming apparatus. If printing is impossible (NO in S1303), it proceeds to S1305. If printing is possible (YES in S1303), the information processing terminal 400 in S1304 displays a superimposed distribution data icon for the image forming apparatus on the touch panel 501.

Figure 14C:
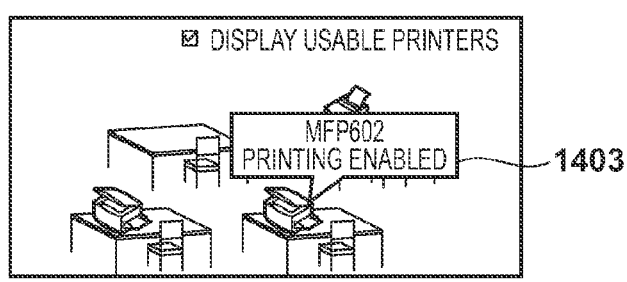

An example of a capturing screen with a data superimposed distribution data icon displayed that indicates a state wherein printing is possible is shown in FIG. 14C. The distribution data icon 1403 in FIG. 14C, indicates that is possible to use the printer.

FIG. 14C shows a situation where, out of three image forming apparatuses displayed on the touch panel 501, only one image forming apparatus can be used. Subsequently, the information processing terminal 400 in S1305 determines whether it has finished processing for all image forming apparatuses included in the display image forming apparatus information 802. In case that unprocessed image forming apparatuses remain (NO in S1305), it returns to S1301.

If processing has completed for all image forming apparatuses (YES in S1305), the information processing terminal 400 determines in S1306 whether a distribution data icon displayed on the touch panel 501 has been tapped. If none has been tapped (NO in S1306), the information processing terminal 400 terminates the display processing.

If a distribution data icon has been pressed, the information processing terminal 400 in S1307 acquires a URL from the distribution data of the image forming apparatus indicated by the pressed distribution data icon. Then, the information processing terminal 400 displays a printing screen using the acquired URL as destination. An example of the printing screen is shown in FIG. 14D.

Figure 14D:
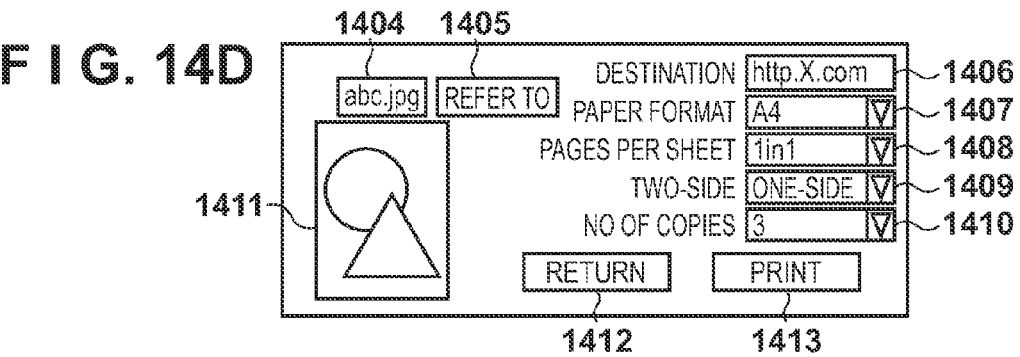

In FIG. 14D, field 1404 is a field for displaying the name of the document to be printed. A button 1405 is a button to use when selecting the document to be printed from documents stored in the storage device 405. Field 1406 is a field for displaying the URL intended to be the destination of the print job, wherein the URL of the printer indicated by the usable icon that was tapped is displayed. Field 1407 is a field for selecting a paper size from a pull down menu. Field 1408 is a field for selecting a number of layouts per page from a pull down menu. Field 1409 is a field for selecting by pull down menu either one-side printing or two-side printing. Field 1410 is a field for selecting by pull down menu the number of copies to be printed. Field 1411 is a field for displaying a preview of the selected document. Return button 1412 is a button to use when dismissing the print settings. Print button 1413 is a button to use when instructing the start of printing.

Figure 14E:
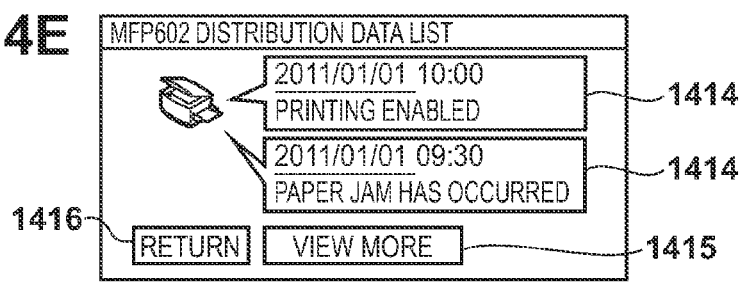

If in S1306 the distribution data icon is pressed and held, the information processing terminal 400 in S1308 displays a distribution data screen. An example of the distribution data screen is shown in FIG. 14E. The distribution data screen displays the past distribution data 1414 read out from the display image forming apparatus information 802 for the selected image forming apparatus. A "View more" button 1415 shown in FIG. 14E is a button to use when displaying distribution data not included in the display image forming apparatus information 802. If the user taps the "View more" button 1415, the information processing terminal 400 newly requests distribution data of the image forming apparatus from the server 300. Then in S1309, the information processing terminal 400 determines whether return button 1416 has been tapped, and in case the return button 1416 has been tapped (YES in S1309) returns to S1301. The return button 1416 shown in FIG. 14E is a button to use when dismissing the distribution data screen.

In S1310, the information processing terminal 400 receives print settings from the user. Then, in S1311, the information processing terminal 400 determines whether the print button 1413 has been tapped. If the print button 1413 has not been tapped (NO in S1311), the information processing terminal 400 determines in S1312 whether the return button 1412 has been tapped. If the return button 1412 has been tapped (YES in S1312), the information processing terminal 400 terminates the display processing. If the return button 1412 has not been tapped (NO in S1312), the information processing terminal 400 returns to S1311.

In case the print button 1413 has been tapped (YES in S1311), the information processing terminal 400 sends the print job to the image forming apparatus that was selected in S1313, and terminates the display process.

<Processing in the Server>

The following describes the processing in the server 300 of the present embodiment with reference to the flowchart of FIG. 15. Further, for each step in the flowchart of FIG. 15, processing is assumed to be performed by the CPU 302 of the server 300, which executes the step, by executing a program stored in the storage device 305.

FIG. 15 shows the flow of the processing in the server. The server 300 waits in S1501 until the information processing terminal information 801 transmitted from the information processing terminal 400 is received. After having received the information processing terminal information 801 (YES at S1501), the server 300 in S1502 calculates the range captured by the camera 450 of the information processing terminal 400, based on the information processing terminal information 801, in relative coordinates from the information processing terminal 400. In calculating, the server 300 uses the direction information stored in the direction field 834, and the angle-of-view information stored in the angle-of-view field 835 of the information processing terminal information 801.

Subsequently, the server 300 in S1503 reads information of one image forming apparatus from the image forming apparatus information table 803, to compare it with the current location information that is stored in the current location field 833 of the information processing terminal information 801. Thence, the server 300 calculates the relative coordinates of the image forming apparatus from the information processing terminal 400. Thereafter, the server 300 in S1504 determines whether the relative coordinates calculated in S1503 are included in the capturing range calculated in S1502. This accounts for locating the image forming apparatus on the image displayed by the information processing terminal 400. If the image forming apparatus is not included in the capturing range (NO in S1504), a return to S1503 is performed. In case the relative coordinates calculated in S1503 are included in the capturing range calculated in S1502 (YES in S1504), the server 300 in S1505 calculates display coordinates of an icon that is to be displayed, superimposed on the image forming apparatus, on the touch panel 501 of the information processing terminal 400. The information processing terminal information 801 shown in FIG. 8A and the position information of the image forming apparatus are used in the calculation of the display coordinates as well.

Then, in S1506 the server 300 adds to the image forming apparatus information 802 one by one the identifying name of the image forming apparatus to an identifying name field 853, the display coordinates calculated in S1505 to a display coordinate field 854, and the distribution data correlated with the identifying name to a distribution data field 855. Then, the server 300 increments by one the terminal count in the image forming apparatus number field 852. Subsequently, the server 300 determines in S1507 whether or not it has finished processing for all image forming apparatuses included in the image forming apparatus information table 803. If there are unprocessed image forming apparatuses (NO in S1507), the server 300 returns to S1503 to perform processing with respect to an unprocessed image forming apparatus. If processing for all image forming apparatuses is finished (YES in S1507), the server 300 in S1508 sends the display image forming apparatus information 802 to the return address stored in the return address field 832 of the information processing terminal information 801, and terminates processing.

<Example of the Display in an Image Forming Apparatus>

Figure 16:
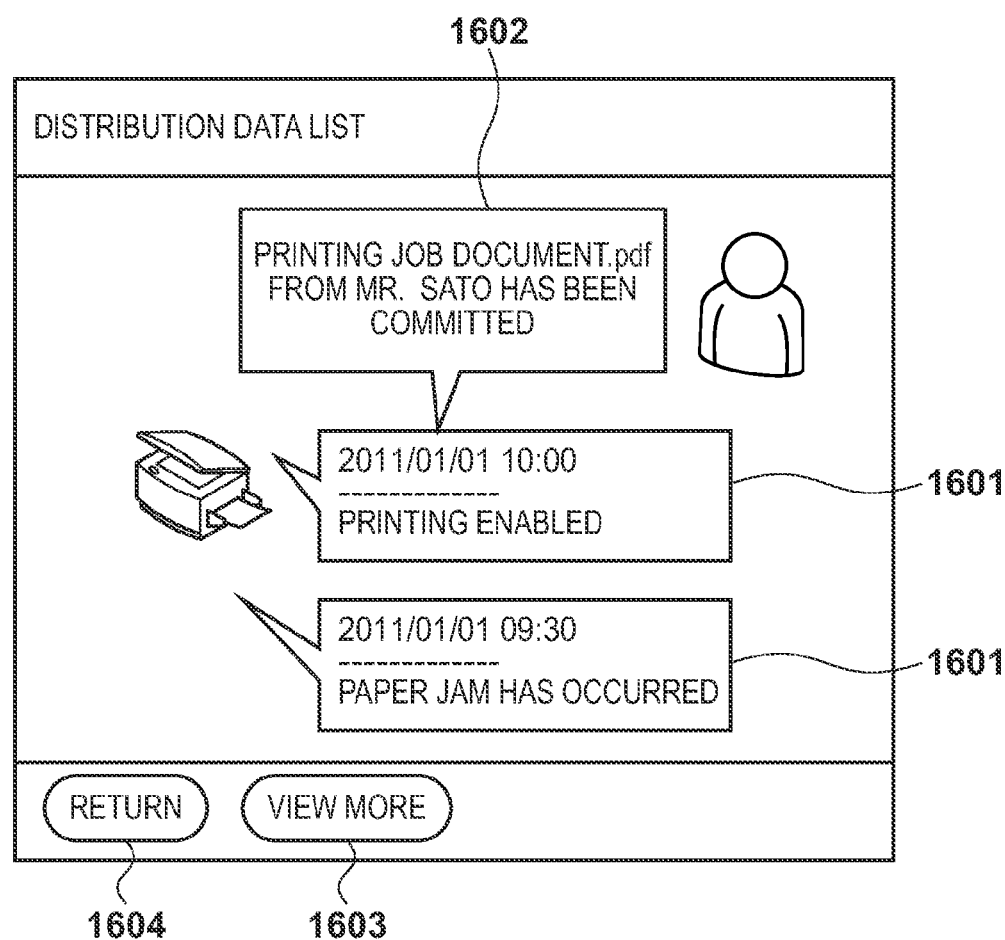
FIG. 16 is a diagram showing an example of a display screen of an image forming apparatus according to the first embodiment.

FIG. 16 is an example for displaying a list of distribution data at the operating unit 107 of the image forming apparatus 100. On the distribution data list screen, the image forming apparatus 100 displays distribution data acquired from the storage device 105 as distribution data icons 1601. Icon 1602 indicates a print job corresponding with the distribution data icons 1601. "View more" button 1603 is a button used to display distribution data that could not currently be displayed. If the user taps the "View more" button 1603, the image forming apparatus 100 acquires distribution data of the past from the storage device 105, and displays it. Of course, the configuration may also be such that own distribution data is acquired from the server 300. Return button 1604 is a button that is used to stop the distribution data list screen.

As evident from the correspondence between icon 1602 and the distribution data icons 1601 on this distribution data list screen, it is possible to display the content of distribution data in association with the content of printing instructions received in response to the distribution data. Thus, the image forming apparatus 100 implements an instruction display unit.

Effect according to the Embodiment

The present embodiment as described above enables a user to grasp, from the information processing terminal 400, the current state of the image forming apparatus 100 by consulting the data distributed by the same, and to instruct printing in response to said data. This indicates that the necessary information exchange for printing, such as designating and setting an apparatus for performing printing and designating a document, can be flexibly performed by using information distributed by image forming apparatuses.

Using FIG. 11, FIG. 12, and FIGS. 14A to 14E, there has been explained one processing example for superimposedly displaying, on the image displayed by the information processing terminal, messages (distribution data) tweeted by apparatuses included in said image. Incidentally, methods other than this superimposing display method may be applied in the present invention.

More specifically, the following processing may be considered. The information processing terminal periodically (for example, every few seconds) transmits current position information of the terminal itself to the server 300, to thereby request distribution data. The server 300, while extracting messages (distribution data) tweeted by devices within a predetermined range (range of tens of meters in radius) that encompasses the position information being transmitted, transmits them one by one to the information processing terminal.

The information processing terminal controls that, among the distribution data received from the server 300, distribution data contained in the capturing range of the capturing unit of the terminal itself is superimposedly displayed, while the remaining distribution data is cached without displaying it, or discarded after being read. That means, filtering of the distribution data will be performed in response to changes in the orientation of the capturing unit of the information processing terminal. Also, tweets of arbitrary timing of the devices present in the vicinity of the information processing terminal will be, due to the periodic requests, transmitted from the server 300 to the information processing terminal in real time. Regarding the communication method, various protocols such as HTTP and WebSocket are applicable.

Second Embodiment

In the second embodiment, an example of sending print data from the information processing terminal 400 to the server 300, and instructing the execution of a print job from the operation unit 107 of the image forming apparatus 100 will be explained. Differences to the first embodiment will be explained, while omitting explanation of overlapping portions.

<Overall Flow of the Printing System>

FIG. 17 describes the overall processing flow of the image forming apparatus 100, the server 300, and the information processing terminal 400 when using the present printing system. First, in S1701 the image forming apparatus 100 distributes data such as shown in FIG. 7 for the first embodiment. Then, in S1702 the information processing terminal 400 displays the distribution data distributed by the image forming apparatus 100. Next, in S1703, the information processing terminal 400 generates print settings according to user requests. In S1704, the information processing terminal 400, based on the generated print settings, transmits a print job to the server 300. Next, in S1705, the image forming apparatus 100 acquires the print job from the server 300. Finally, in S1706, the image forming apparatus 100 executes print processing of the print data to be printed, based on the acquired print job.

<Processing in the Information Processing Terminal>

This is the same as in FIG. 11, FIG. 12, and FIG. 13. However, in this embodiment, in S1313 shown in FIG. 13, the transmit destination of the print job from the information processing terminal 400 is the server 300. Also, the information processing terminal 400 sends to the image forming apparatus 100 the fact that a print job was sent to the server 300, the name of the user who sent the print job, and the document name. As the contents of the print job, the information processing terminal 400 transmits the identifying name of the image forming apparatus, image data, and the print settings.

<Processing in the Server>

This is the same as the flowchart of FIG. 15. However, when receiving a print job from the information processing terminal 400, the server 300 saves the print job received in the storage device 305. Further, when receiving a print job acquisition request from the image forming apparatus 100, the server 300 matches the print job stored with the identifying name of the requesting image forming apparatus 100, and transmits the corresponding print job to the image forming apparatus 100.

<Display Example in the Image Forming Apparatus>

Figure 18A:
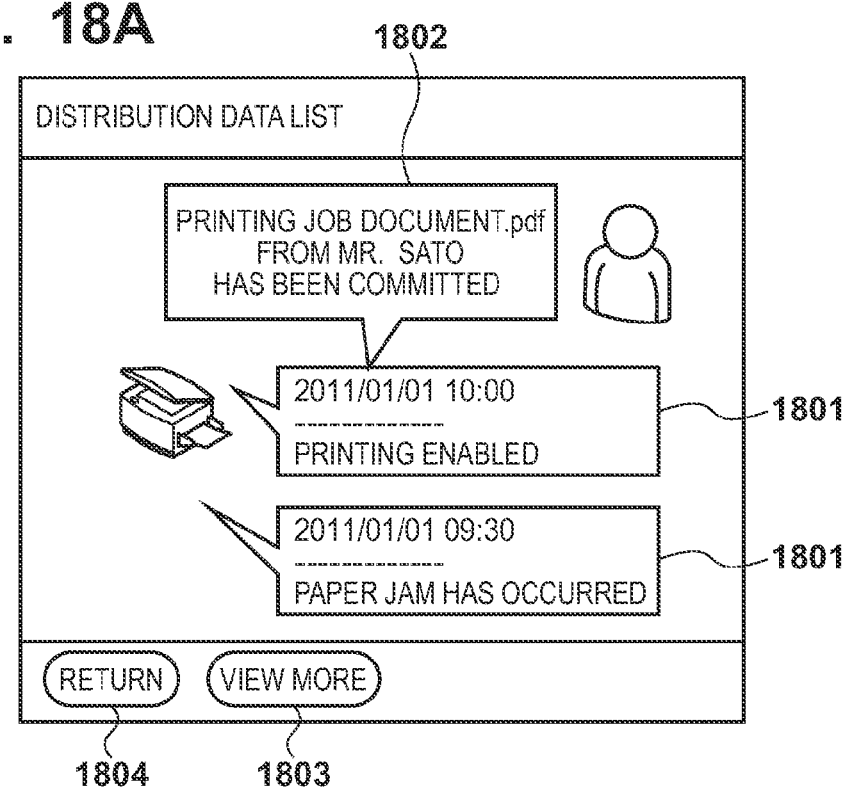
FIGS. 18A and 18B are diagrams showing examples of a display screen of an image forming apparatus according to the second embodiment.

FIG. 18A shows a display example at the operation unit 107 of the image forming apparatus 100, when instructing a print job acquisition. In this embodiment, it is possible at the image forming apparatus 100 to acquire jobs from the distribution data list screen shown in FIG. 16 for the first embodiment. The image forming apparatus 100 acquires distribution data from the storage device 105, and displays it as a distribution data icon 1801 such as on the distribution data list screen shown in FIG. 18A. Icon 1802 shows a print job transmitted to the server 300 that corresponds to the distribution data icon 1801.

The "View more" button 1803 is a button used to display distribution data that could not currently be displayed. If the user taps the "View more" button 1803, the image forming apparatus 100 acquires distribution data of the past from the storage device 105, and displays it. Of course, the image forming apparatus 100 may also acquire own distribution data from the server 300. Return button 1804 is a button that is used to stop the distribution data list screen.

Figure 18B:
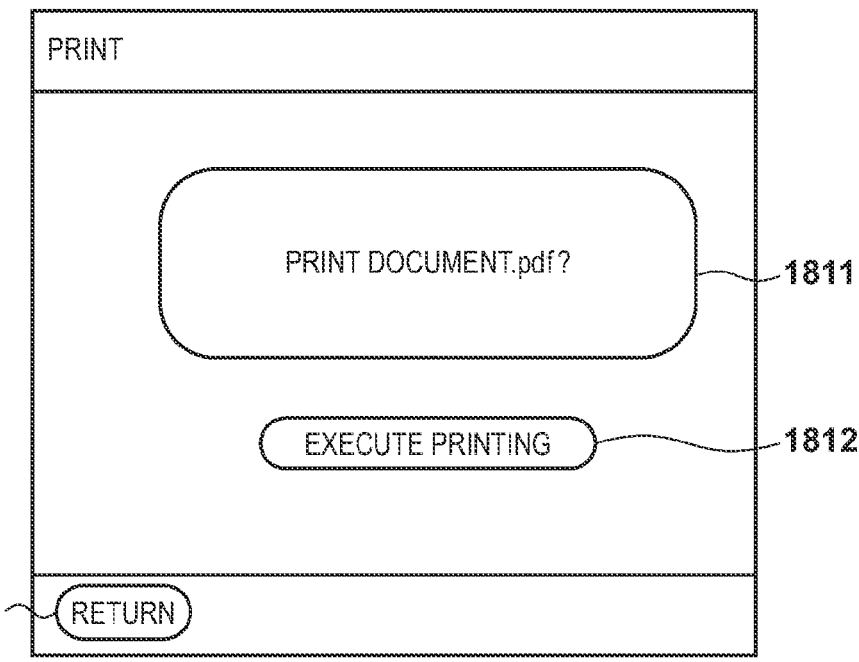

If the user taps the icon 1802, a transition is made to the print screen of FIG. 18B. In message 1811, the document name is displayed together with a message asking to confirm whether printing is to be performed. Print execution button 1812 is a button for instructing the image forming apparatus 100 to acquire the print job and execute the printing. Return button 1813 is a button that is used to cancel the print screen. In addition, a configuration is also possible where when pressing the print execution button 1812 on this screen, a user name and password are prompted to be entered, so that the designated print job is acquired and printing performed only if the authentication succeeds. In this case, when giving print instructions on the information processing terminal, it is desirable to set information such as user name and password in advance.

Further, the distribution data associated with print jobs may also be displayed on a screen for confirming the printing history. In this case, the image forming apparatus 100 is configured to map distribution data to the printing jobs corresponding to the distribution data, and hold it as history in the in the storage device 105.

Effect According to the Embodiment

The present embodiment as described above enables, in addition to the effect of the first embodiment, to instruct, from the data, transmission of a print job to the server 300. Moreover, by instructing from the image forming apparatus 100 the acquisition of print jobs, printing is enabled to be executed with arbitrary timing. Further, there is the effect that, in the image forming apparatus 100, the short messages (tweets) that were seen by a user when giving printing instructions on an information processing terminal are enabled to be confirmed while looking up past actions where printing was instructed.

Other Embodiments

Another embodiment may be realized, in the case that the transmission of print jobs is performed from the information processing terminal 400 to the server 300, by having the image forming apparatus 100 query the server 300 on a regular basis for acquisition of a print job. Accordingly, printing is enabled to be executed without instructing the acquisition of a print job.

Further in the case that the transmission of print jobs is performed from the information processing terminal 400 to the server 300, print jobs may be transmitted to the image forming apparatus 100 on the initiative of the server 300. Accordingly, printing is enabled to be performed without increasing the load of the image forming apparatus 100.

Also, the transmission of print jobs from the information processing terminal 400 may be performed to a dedicated print job storing server (not shown), different from the server 300. Thus using a dedicated server for storing print jobs enables to execute printing while maintaining security.

Further, distribution data may be generated such that a URL to download software, such as drivers, required to control the image forming apparatus 100 is in the distribution data. The selection of distribution data containing a URL by the information processing terminal 400 may enable the download of a driver. In addition, by selecting distribution data, the image forming apparatus 100 may be enabled to be registered in the information processing terminal 400. Through these measures, by a method different from the prior art, the download of drivers and the registration of the image forming apparatus 100 are easily enabled, which improves usability.

Further, in the embodiments described above, configurations were explained wherein the environment around a user is captured using a camera comprised by an information processing terminal, and distribution data is superimposed on the captured image. However, there is no limitation to this. For example, the image displayed on the display of the information processing terminal may be acquired from map information defined in advance. In this case, a surroundings image for the user utilizing the information processing terminal may be calculated using predefined map information and the position information of the information processing terminal as well as the image forming apparatus, to superimpose distribution data onto the image forming apparatuses on the surroundings image. In this case, it is also possible to configure the system according to the present invention without using the camera.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-268369, filed Dec. 7, 2011, which is hereby incorporated by reference herein in its entirety.

What is claimed is:

1. A printing system including an image forming apparatus, a server, and an information processing terminal for displaying an image acquired by a capturing unit on a display,
wherein the image forming apparatus comprises:
a distribution unit configured to distribute distribution data that includes position information of the image forming apparatus and a message for being displayed, and
a printing unit configured to perform print processing according to received print data,
wherein the server comprises:
an acquisition unit configured to acquire position information of the information processing terminal,
a management unit configured to acquire and manage distribution data distributed by the image forming apparatus, and
a transmission unit configured to transmit distribution data identifiable from position information of the image forming apparatus and the information processing terminal, managed by the management unit, and to include a message displayable on a display of the information processing terminal, to the information processing terminal, and
wherein the information processing terminal comprises:
a position information transmission unit configured to transmit current position information of the information processing terminal to the server,
a reception unit configured to receive the distribution data from the server in response to the transmission of the current position information,
a display unit configured to perform display control such that, when an image including the image forming apparatus is displayed on the display, a message included in distribution data distributed by the image forming apparatus and received from the server is superimposedly displayed on the image,
an acceptance unit configured to accept a print instruction made after the message displayed on the display is selected, and
a print data transmission unit configured to transmit print data to the image forming apparatus that distributed the distribution data containing the selected message according to the print instruction,
wherein the position information of the information processing terminal includes current coordinate information of the information processing terminal and information of a direction in which the capturing unit is facing.

2. The print system according to claim 1, wherein the position information of the information processing terminal further includes information of an angle of view of the capturing unit and a dimension of the display.

3. The print system according to claim 1, wherein the distribution unit of the image forming apparatus issues and distributes the distribution data upon a state of processing of the print data having changed, or upon an event that influences print processing having occurred within the image forming apparatus.

4. The print system according to claim 1, wherein the display unit of the information processing terminal performs display control such that the message is superimposed with respect to, among image forming apparatuses included in the image displayed on the display, an image forming apparatus that is usable to a user of the information processing terminal.

5. The print system according to claim 1, wherein the image forming apparatus further comprises an instruction display unit configured to display a message included in distribution data distributed by the apparatus itself, associated with a print instruction in response to selecting the message.

6. The print system according to claim 1, wherein the image forming apparatus further comprises a history holding unit configured to hold a message included in distribution data distributed by the apparatus itself, associated with a print instruction in response to selecting the message.

7. The print system according to claim 1, wherein the distribution data includes information for acquiring software necessary for controlling the image forming apparatus having distributed the distribution data.

8. The print system according to claim 1, wherein the position information of the image forming apparatus includes coordinate information of the image forming apparatus.

9. The print system according to claim 8, wherein the position information of the image forming apparatus further includes a URL (Uniform Resource Locator) or IP address for performing communication with the image forming apparatus.

10. The print system according to claim 9, wherein the print data transmission unit of the information processing terminal uses the URL or IP address included in the distribution data received from the server to transmit the print data to the image forming apparatus.

11. The print system according to claim 1, wherein the print data transmission unit of the information processing terminal transmits the print data to the server instead of the image forming apparatus corresponding to the print instruction,
wherein the printing unit of the image forming apparatus performs the print processing by receiving the print data from the server.

12. A method for controlling a printing system including an image forming apparatus, a server, and an information processing terminal for displaying an image acquired by a capturing unit on a display, the method comprising:

in the image forming apparatus:
distributing distribution data that includes position information of the image forming apparatus and a message for being displayed, and
performing print processing according to received print data, in the server:
acquiring position information of the information processing terminal,
acquiring and managing distribution data distributed by the image forming apparatus, and
transmitting distribution data identifiable from position information of the image forming apparatus and the information processing terminal, managed in the management step, and including a message displayable on a display of the information processing terminal, to the information processing terminal, and
in the information processing terminal:
transmitting current position information of the information processing terminal to the server,
receiving the distribution data from the server in response to the transmission of the current position information,
performing display control such that, when an image including the image forming apparatus is displayed on the display, a message included in distribution data distributed by the image forming apparatus and received from the server is superimposedly displayed on the image,
accepting a print instruction made after the message displayed on the display is selected, and
transmitting print data to the image forming apparatus that distributed the distribution data containing the selected message according to the print instruction,
wherein the position information of the information processing terminal includes current coordinate information of the information processing terminal and information of a direction in which the capturing unit is facing.

13. An information processing terminal for communicating with a server for managing messages distributed by an image forming apparatus, comprising:
a position information transmission unit configured to transmit current position information of the information processing terminal to the server;
a reception unit configured to receive data including the messages from the server in response to the transmission of the current position information;
a display unit configured to control to display, in association with the image forming apparatus, a message distributed by the image forming apparatus based on the data received from the server;
an acceptance unit configured to accept a print instruction made after the displayed message is selected; and
a print data transmission unit configured to transmit print data to the image forming apparatus that distributed the selected message according to the print instruction,
wherein the position information transmission unit is configured to transmit, as the current position information, current coordinate information and information of a direction.

14. The information processing terminal according to claim 13, wherein the data received by the reception unit includes a Uniform Resource Locator or IP address for performing communication with the image forming apparatus, and
wherein the print data transmission unit uses the URL or IP address included in the data received from the server to transmit the print data to the image forming apparatus.

15. The information processing terminal according to claim 13, wherein the display is a touch panel, and
wherein the acceptance unit, upon tapping a message displayed on the display, accepts a printing instruction to the image forming apparatus having distributed the message.

16. The information processing terminal according to claim 13, further comprising a registration unit configured to register the image forming apparatus corresponding to the print instruction in the terminal itself.

17. A non-transitory computer readable medium storing a program for causing a computer to function as each of the units according to claim 13.

18. A control method in an information processing terminal communicating with a server for managing messages distributed by an image forming apparatus, comprising:
transmitting current position information of the information processing terminal to the server;
receiving data including the messages from the server in response to the transmission of the current position information;
displaying, in association with the image forming apparatus, a message distributed by the image forming apparatus based on the data received from the server;
accepting a print instruction made after the displayed message is selected; and
transmitting print data to the image forming apparatus that distributed the selected message according to the print instruction,
wherein current coordinate information and information of a direction are transmitted to the server as the current position information.

* * * * *